US008982513B1

(12) United States Patent
Tian et al.

(10) Patent No.: US 8,982,513 B1
(45) Date of Patent: Mar. 17, 2015

(54) DISK DRIVE HEAD SUSPENSION WITH DUAL PIEZOELECTRIC ELEMENTS ADHERED TO ROTARY-ACTUATED AND NON-ACTUATED PORTIONS OF A STRUCTURAL LAYER OF A TONGUE OF A LAMINATED FLEXURE

(71) Applicant: Western Digital Technologies, Inc., Irvine, CA (US)

(72) Inventors: Jifang Tian, Fremont, CA (US); Jian Yang, Fremont, CA (US); Qiang Yang, Fremont, CA (US); William S. Wang, San Jose, CA (US); Yih-Jen D. Chen, Pleasanton, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/931,610

(22) Filed: Jun. 28, 2013

Related U.S. Application Data

(60) Provisional application No. 61/825,837, filed on May 21, 2013.

(51) Int. Cl.
*G11B 5/596* (2006.01)
*G11B 5/48* (2006.01)

(52) U.S. Cl.
CPC ................... *G11B 5/4873* (2013.01)
USPC ..................... 360/294.4; 360/245.3

(58) Field of Classification Search
CPC .. G11B 5/5552; G11B 5/4826; G11B 5/4873; G11B 5/4833; G11B 5/4853; G11B 5/596; G11B 5/482; G11B 21/10

USPC .......... 360/294.3, 294.4, 244.2, 244.5, 244.8, 360/245, 245.1, 245.3, 245.4

See application file for complete search history.

(56) References Cited

U.S. PATENT DOCUMENTS

| 4,945,438 | A | 7/1990 | Matsumoto et al. |
|---|---|---|---|
| 5,465,186 | A | 11/1995 | Bajorek et al. |
| 5,870,258 | A | 2/1999 | Khan et al. |
| 5,883,758 | A | 3/1999 | Bennin et al. |
| 5,894,651 | A | 4/1999 | Dvorsky et al. |
| 5,898,541 | A | 4/1999 | Boutaghou et al. |
| 5,920,145 | A | 7/1999 | Wu et al. |
| 5,920,978 | A | 7/1999 | Koshikawa et al. |

(Continued)

OTHER PUBLICATIONS

Kuwajima et al., Thin-Film Piezoelectric DSA for HOD, IEEE Trans. Magn., vol. 38, No. 5, Sep. 2002, pp. 2186-D 2188.

(Continued)

*Primary Examiner* — Brian Miller

(57) ABSTRACT

A disk drive head gimbal assembly includes a laminated flexure with a tongue having an actuated portion that rotates about an axis of rotation by expansion of a first adhered piezoelectric element relative to a second adhered piezoelectric element. A non-actuated portion of the tongue adjoins and forms a bridge between two outrigger beams, with a dimple contact location that is in contact with a dimple of the load beam and through which the axis of rotation passes. A read head is adhered, closer to its leading end than to its trailing end, to the actuated portion of the tongue. Each of the first and second piezoelectric elements has an anchored end that is adhered to the bridge, closer to the trailing end of the read head, and an opposing actuated end adhered to the actuated portion of the tongue, closer to the leading end of the read head.

20 Claims, 4 Drawing Sheets

(56) References Cited

U.S. PATENT DOCUMENTS

| | | | |
|---|---|---|---|
| 5,956,212 A | 9/1999 | Zhu | |
| 5,959,807 A | 9/1999 | Jurgenson | |
| 6,052,879 A | 4/2000 | Wu et al. | |
| 6,246,552 B1 * | 6/2001 | Soeno et al. | 360/294.4 |
| 6,249,404 B1 | 6/2001 | Doundakov et al. | |
| 6,262,869 B1 | 7/2001 | Lin et al. | |
| 6,291,930 B1 | 9/2001 | Sager | |
| 6,297,936 B1 * | 10/2001 | Kant et al. | 360/294.4 |
| 6,320,730 B1 | 11/2001 | Stefansky et al. | |
| 6,351,352 B1 | 2/2002 | Khan et al. | |
| 6,351,353 B1 | 2/2002 | Sluzewski et al. | |
| 6,351,354 B1 | 2/2002 | Bonin | |
| 6,376,964 B1 * | 4/2002 | Young et al. | 310/311 |
| 6,421,211 B1 | 7/2002 | Hawwa et al. | |
| 6,459,549 B1 | 10/2002 | Tsuchiya et al. | |
| 6,487,045 B1 | 11/2002 | Yanagisawa | |
| 6,501,625 B1 | 12/2002 | Boismier et al. | |
| 6,515,832 B1 | 2/2003 | Girard | |
| 6,570,730 B1 | 5/2003 | Lewis et al. | |
| 6,624,984 B2 | 9/2003 | Lewis et al. | |
| 6,661,619 B2 | 12/2003 | Nishida et al. | |
| 6,704,158 B2 | 3/2004 | Hawwa et al. | |
| 6,738,231 B2 | 5/2004 | Arya et al. | |
| 6,760,196 B1 | 7/2004 | Niu et al. | |
| 6,807,030 B1 | 10/2004 | Hawwa et al. | |
| 6,870,709 B2 | 3/2005 | Shimanouchi et al. | |
| 6,883,215 B2 | 4/2005 | Takeuchi et al. | |
| 6,928,722 B2 | 8/2005 | Yanagisawa | |
| 6,961,221 B1 | 11/2005 | Niu et al. | |
| 6,965,499 B1 | 11/2005 | Zhang et al. | |
| 6,993,824 B2 | 2/2006 | Childers et al. | |
| 7,002,780 B2 | 2/2006 | Rancour et al. | |
| 7,006,330 B1 | 2/2006 | Subrahmanyam et al. | |
| 7,006,331 B1 | 2/2006 | Subrahmanyam et al. | |
| 7,023,663 B2 | 4/2006 | Yao et al. | |
| 7,050,270 B1 | 5/2006 | Oveyssi et al. | |
| 7,057,857 B1 * | 6/2006 | Niu et al. | 360/245.4 |
| 7,057,858 B2 | 6/2006 | Pan et al. | |
| 7,072,149 B2 | 7/2006 | Kuwajima et al. | |
| 7,082,671 B2 | 8/2006 | Yanagisawa | |
| 7,113,372 B2 | 9/2006 | Segar et al. | |
| 7,151,650 B2 | 12/2006 | Lee | |
| 7,159,300 B2 | 1/2007 | Yao et al. | |
| 7,248,444 B1 | 7/2007 | Lauer | |
| 7,277,257 B2 | 10/2007 | Hipwell, Jr. et al. | |
| 7,280,319 B1 | 10/2007 | McNab | |
| 7,301,731 B2 | 11/2007 | Mita et al. | |
| 7,312,941 B2 | 12/2007 | Hirano et al. | |
| 7,345,851 B2 | 3/2008 | Hirano et al. | |
| 7,352,538 B2 | 4/2008 | Kurihara et al. | |
| 7,375,930 B2 * | 5/2008 | Yang et al. | 360/294.4 |
| 7,382,583 B2 | 6/2008 | Hirano et al. | |
| 7,391,590 B2 | 6/2008 | Matono et al. | |
| 7,403,357 B1 | 7/2008 | Williams | |
| 7,411,764 B2 | 8/2008 | Yang et al. | |
| 7,417,831 B2 | 8/2008 | Yao et al. | |
| 7,420,785 B2 | 9/2008 | Yamazaki et al. | |
| 7,466,520 B2 | 12/2008 | White et al. | |
| 7,471,490 B2 | 12/2008 | Yao | |
| 7,474,512 B2 | 1/2009 | Yao et al. | |
| 7,525,769 B2 | 4/2009 | Yao et al. | |
| 7,535,680 B2 | 5/2009 | Yao et al. | |
| 7,538,984 B2 | 5/2009 | Yao | |
| 7,545,605 B2 | 6/2009 | Hagiya et al. | |
| 7,554,773 B2 | 6/2009 | Zhu et al. | |
| 7,567,019 B2 | 7/2009 | Yamanaka et al. | |
| 7,567,410 B1 | 7/2009 | Zhang et al. | |
| 7,593,190 B1 | 9/2009 | Thornton et al. | |
| 7,609,487 B2 | 10/2009 | Yao et al. | |
| 7,612,963 B2 | 11/2009 | Allen et al. | |
| 7,612,967 B2 | 11/2009 | Kwon et al. | |
| 7,663,843 B2 | 2/2010 | Yao | |
| 7,684,158 B1 | 3/2010 | Lauer | |
| 7,688,553 B1 | 3/2010 | Williams et al. | |
| 7,697,237 B1 | 4/2010 | Danielson | |
| 7,701,675 B2 | 4/2010 | Yao et al. | |
| 7,719,798 B2 | 5/2010 | Yao | |
| 7,733,607 B2 | 6/2010 | Yao et al. | |
| 7,777,991 B2 | 8/2010 | Feng et al. | |
| 7,813,082 B2 | 10/2010 | Rice et al. | |
| 7,916,427 B2 | 3/2011 | Lauer | |
| 8,015,692 B1 | 9/2011 | Zhang et al. | |
| 8,027,128 B2 | 9/2011 | Muraki et al. | |
| 8,054,585 B2 | 11/2011 | Zeng et al. | |
| 8,085,508 B2 * | 12/2011 | Hatch | 360/294.4 |
| 8,111,487 B2 | 2/2012 | Lauer | |
| 8,130,469 B2 | 3/2012 | Yao | |
| 8,130,470 B2 | 3/2012 | Muraki et al. | |
| 8,149,545 B1 * | 4/2012 | Chai et al. | 360/294.3 |
| 8,208,224 B1 | 6/2012 | Teo et al. | |
| 8,264,797 B2 | 9/2012 | Emley | |
| 8,295,012 B1 | 10/2012 | Tian et al. | |
| 8,310,790 B1 | 11/2012 | Fanslau, Jr. | |
| 8,446,694 B1 * | 5/2013 | Tian et al. | 360/245 |
| 8,488,281 B1 | 7/2013 | Pan | |
| 8,508,888 B2 * | 8/2013 | Ohsawa | 360/234.5 |
| 8,593,764 B1 * | 11/2013 | Tian et al. | 360/245.4 |
| 8,605,389 B1 | 12/2013 | Pan et al. | |
| 8,675,314 B1 * | 3/2014 | Bjorstrom et al. | 360/294.3 |
| 8,797,691 B1 | 8/2014 | Tian et al. | |
| 2002/0191342 A1 | 12/2002 | Yanagisawa | |
| 2004/0226164 A1 | 11/2004 | Girard | |
| 2004/0246625 A1 | 12/2004 | Tsuchida et al. | |
| 2005/0047019 A1 | 3/2005 | Childers et al. | |
| 2005/0105217 A1 | 5/2005 | Kwon et al. | |
| 2005/0117257 A1 | 6/2005 | Thaveeprungsriporn et al. | |
| 2005/0286176 A1 | 12/2005 | Yao et al. | |
| 2006/0193086 A1 | 8/2006 | Zhu et al. | |
| 2006/0262456 A1 | 11/2006 | Wang et al. | |
| 2007/0223144 A1 | 9/2007 | Yao et al. | |
| 2007/0263325 A1 | 11/2007 | Hanya et al. | |
| 2007/0291419 A1 | 12/2007 | Lee et al. | |
| 2008/0024933 A1 | 1/2008 | Yao et al. | |
| 2008/0030900 A1 | 2/2008 | Zeng et al. | |
| 2008/0030905 A1 | 2/2008 | Yamanaka et al. | |
| 2008/0144223 A1 | 6/2008 | Muraki et al. | |
| 2008/0144225 A1 | 6/2008 | Yao et al. | |
| 2008/0180850 A1 | 7/2008 | Rice et al. | |
| 2008/0198511 A1 | 8/2008 | Hirano et al. | |
| 2009/0021857 A1 | 1/2009 | Shelor | |
| 2009/0034128 A1 | 2/2009 | Sharma et al. | |
| 2009/0080116 A1 | 3/2009 | Takahashi et al. | |
| 2009/0284870 A1 * | 11/2009 | Nojima et al. | 360/244 |
| 2010/0246071 A1 * | 9/2010 | Nojima et al. | 360/294.4 |
| 2011/0116192 A1 | 5/2011 | Fujita et al. | |
| 2011/0149439 A1 | 6/2011 | Emley | |
| 2011/0176242 A1 | 7/2011 | Lauer | |
| 2011/0228425 A1 | 9/2011 | Liu et al. | |
| 2012/0242191 A1 | 9/2012 | Aimono | |
| 2013/0020112 A1 * | 1/2013 | Ohsawa | 174/255 |
| 2013/0242434 A1 * | 9/2013 | Bjorstrom et al. | 360/234.4 |
| 2014/0022674 A1 * | 1/2014 | Takikawa et al. | 360/244.5 |

OTHER PUBLICATIONS

Oldham et al., Thin-Film PZT Lateral Actuators With Extended Stroke, Journal of Microelectromechanical Systems, D vol. 17, No. 4, Aug. 2008, pp. 890-899.

Seq et al., "Laterally driven thin film PZT actuator with high-aspect-ratio silicon beam for stroke amplification", Sensors D and Actuators A, vol. 127 (2006), pp. 302-309.

* cited by examiner

DISK DRIVE HEAD SUSPENSION WITH DUAL PIEZOELECTRIC ELEMENTS ADHERED TO ROTARY-ACTUATED AND NON-ACTUATED PORTIONS OF A STRUCTURAL LAYER OF A TONGUE OF A LAMINATED FLEXURE

CROSS-REFERENCE TO RELATED APPLICATION

This application claims priority to provisional U.S. Patent Application Ser. No. 61/825,837, filed on May 21, 2013, which is incorporated herein in its entirety.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices and functions the read head may also perform (e.g., writing, flying height control, touch down detection, lapping control, etc.).

In a modern magnetic hard disk drive device, each read head is a sub-component of a head gimbal assembly (HGA). The read head typically includes a slider, and a read/write transducer deposited on a trailing end of the slider. The read/write transducer typically comprises a magneto-resistive read element (e.g., so-called giant magneto-resistive read element, or a tunneling magneto-resistive read element), and an inductive write structure comprising a flat coil deposited by photolithography, and a yoke structure having pole tips that face a disk media.

The HGA typically also includes a suspension assembly that includes a mounting plate, a load beam, and a laminated flexure to carry the electrical signals to and from the read head. The read head is typically bonded to a tongue feature of the laminated flexure. The HGA, in turn, is a sub-component of a head stack assembly (HSA). The HSA typically includes a rotary actuator having a plurality of actuator arms, a plurality of HGAs (attached to the actuator arms), and a flexible printed circuit that includes a flex cable. The mounting plate of each suspension assembly is attached to an arm of the rotary actuator (e.g., by swaging), and each of the laminated flexures includes a flexure tail that is electrically connected to the HSA's flex cable (e.g., by solder reflow bonding or ultrasonic bonding).

Modern laminated flexures typically include electrically conductive copper traces that are isolated from a stainless steel support layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes electrically conductive traces that are electrically connected to a plurality of electrically conductive bonding pads on the head (e.g., by 90° solder jet bonding), and extend from adjacent the head to terminate at electrical connection points at the flexure tail.

The position of the HSA relative to the spinning disks in a disk drive, and therefore the position of the read heads relative to data tracks on the disks, is actively controlled by the rotary actuator which is typically driven by a voice coil motor (VCM). Specifically, electrical current passed through a coil of the VCM applies a torque to the rotary actuator, so that the read head can seek and follow desired data tracks on the spinning disk.

However, the industry trend towards increasing areal data density has necessitated substantial reduction in the spacing between data tracks on the disk. Also, disk drive performance requirements, especially requirements pertaining to the time required to access desired data, have not allowed the rotational speed of the disk to be reduced. In fact, for many disk drive applications, the rotational speed has been significantly increased. A consequence of these trends is that increased bandwidth is required for servo control of the read head position relative to data tracks on the spinning disk.

One solution that has been proposed in the art to increase disk drive servo bandwidth is dual-stage actuation. Under the dual-stage actuation concept, the rotary actuator that is driven by the VCM is employed as a coarse actuator (for large adjustments in the HSA position relative to the disk), while a so-called "microactuator" having higher bandwidth but lesser stroke is used as a fine actuator (for smaller adjustments in the read head position). Various microactuator designs have been proposed in the art for the purpose of dual-stage actuation in disk drive applications. Some of these designs utilize one or more piezoelectric microactuators that are affixed to a component of the suspension assembly. For example, the piezoelectric microactuator may be affixed to the mounting plate or an extension thereof, and/or the load beam or an extension thereof, or to the flexure tongue (a.k.a. the "gimbal tongue") to which the read head is bonded.

However, generally, the further the microactuator is disposed from the read head on the suspension assembly, the less bandwidth it can provide. This is due to the dynamics introduced by the intermediate structure of the suspension assembly. On the other hand, the closer the microactuator is disposed to the read head on the suspension assembly, the lesser stroke it can typically provide. As track density increases, the need for additional bandwidth tends to exceed the need for additional stroke, tending to favor microactuator designs that are more distally located (e.g., at or near the read head). Hence there is a need in the information storage device arts for a distally located microactuator design that can provide both adequate stroke and adequate bandwidth for fine actuation.

Moreover, certain prior art design concepts in which the microactuator is disposed on the flexure tongue may have other performance disadvantages. For example, in certain designs, the motion imparted by the microacutator may be undesirably coupled with the yaw or "sway" mode of vibration of the head gimbal assembly. Also for example, the microactuator operation may require relative motion at the dimple contact location between the flexure tongue and the load beam, which can cause undesirable fretting, debris, and a stick-slip motion characteristic. Also for example, the flexure design for accommodating the microactuator may lack desired stiffness in certain directions (e.g., vertical stiffness or yaw stiffness), and/or may lack desired compliance in other directions (pitch compliance or roll compliance). Also for example, the microactuated HGA design may include additional parts and complexity that add cost and time to the manufacturing process, such as where the structure that supports the microactuator components is attached to (rather than built into and integral with) the flexure tongue. Also for example, the flexure design for accommodating a microactuator on the tongue may not provide for adequate bonding area to reliably bond the head to the tongue with consistently adequate strength in a practical high volume manufacturing process.

Hence, there is a need in the information storage device arts for improved fine actuator ("microactuator") designs for HGAs.

DETAILED DESCRIPTION OF EXEMPLARY EMBODIMENTS

Figure 1:
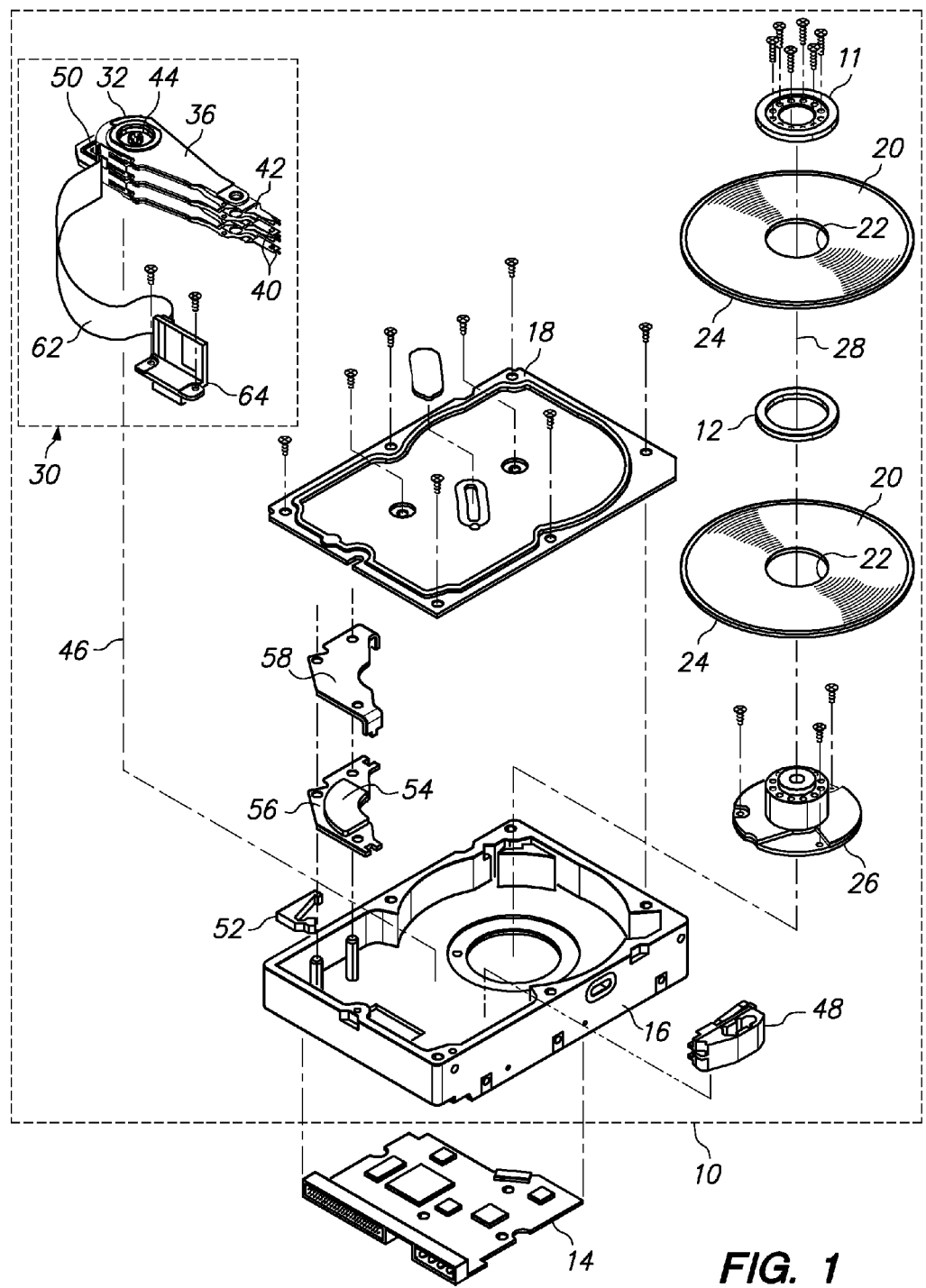
FIG. 1 is an exploded perspective view of a disk drive capable of including an embodiment of the present invention.

FIG. 1 is an exploded perspective view of an example disk drive that is capable of including an embodiment of the present invention. The example disk drive includes a head disk assembly (HDA) 10 and a printed circuit board assembly (PCBA) 14. The HDA 10 includes a base 16 and cover 18 that together form a disk drive enclosure that houses at least one annular magnetic disk 20. Each disk 20 contains a plurality of magnetic tracks for storing data. The tracks are disposed upon opposing first and second disk surfaces of the disk 20 that extend between an inner disk edge 22 (corresponding to the inner diameter) and an outer disk edge 24 (corresponding to the outer diameter) of the disk 20. The head disk assembly 10 further includes a spindle motor 26 for rotating the disks 20 about a disk axis of rotation 28. The spindle motor 26 includes a spindle motor hub that is rotatably attached to the base 16 of the HDA 10. Disks 20 may be stacked and separated with one or more annular disk spacers 12 that are disposed about the hub, all held fixed to the hub by disk clamp 11.

In certain embodiments, the HDA 10 further includes a head stack assembly (HSA) 30 rotatably attached to the base 16 of HDA 10. The HSA 30 includes an actuator comprising an actuator body 32 and one or more actuator arms 36 extending from the actuator body 32. The actuator body 32 includes a bore and a pivot bearing cartridge 44 engaged within the bore for facilitating the HSA 30 to rotate relative to HDA 10 about actuator pivot axis 46. For example, the actuator body 32 may be pivotally attached to the base 16 of HDA 10, by the pivot bearing cartridge 44. One or two head gimbal assemblies (HGA) 42 are attached to a distal end of each actuator arm 36. In certain embodiments, each HGA 42 includes a head (e.g., head 40) for reading and writing data from and to the disk 20, and a load beam to compliantly preload the head against the disk 20.

In the example of FIG. 1, the HSA 30 further includes a coil support that extends from one side of the HSA 30 that is opposite head 40. The coil support is configured to support a coil 50 through which a controlled electrical current is passed. The coil 50 interacts with one or more magnets 54 that are attached to base 16 via a yoke structure 56, 58 to form a voice coil motor for controllably rotating the HSA 30. HDA 10 includes a latch 52 rotatably mounted on base 16 to prevent undesired rotations of HSA 30.

In certain embodiments, the PCBA 14 includes a servo control system for generating servo control signals to control the current through the coil 50 and thereby position the HSA 30 relative to tracks disposed upon surfaces of disk 20. In certain embodiments, the HSA 30 is electrically connected to PCBA 14 via a flexible printed circuit (FPC) 62, which includes a flex cable and a flex cable support bracket 64. The FPC 62 supplies current to the coil 50 and carries signals between the HSA 30 and the PCBA 14. Before periods of non-operation, the HSA 30 is positioned so that the HGAs 42 are moved beyond the outer disk edge 24, so that a distal tip (i.e. a load tab) of the load beam of each HGA 42 rides up on a head loading/unloading ramp 48. With the HGAs 42 "parked" on the head loading/unloading ramp 48, mechanical shock events are prevented from causing impacts between the heads 40 and the surfaces of the disks 20.

In the magnetic hard disk drive of FIG. 1, each head 40 includes a body called a "slider" that carries a magnetic transducer on its trailing end (not visible given the scale of FIG. 1). The magnetic transducer may include an inductive write element and a magnetoresistive read element. During operation the transducer is separated from the magnetic disk by a very thin hydrodynamic air bearing. As the motor 26 rotates the magnetic disk 20, the hydrodynamic air bearing is formed between an air bearing surface of the slider of head 40, and a surface of the magnetic disk 20. The thickness of the air bearing at the location of the transducer is commonly referred to as "flying height."

Figure 2:
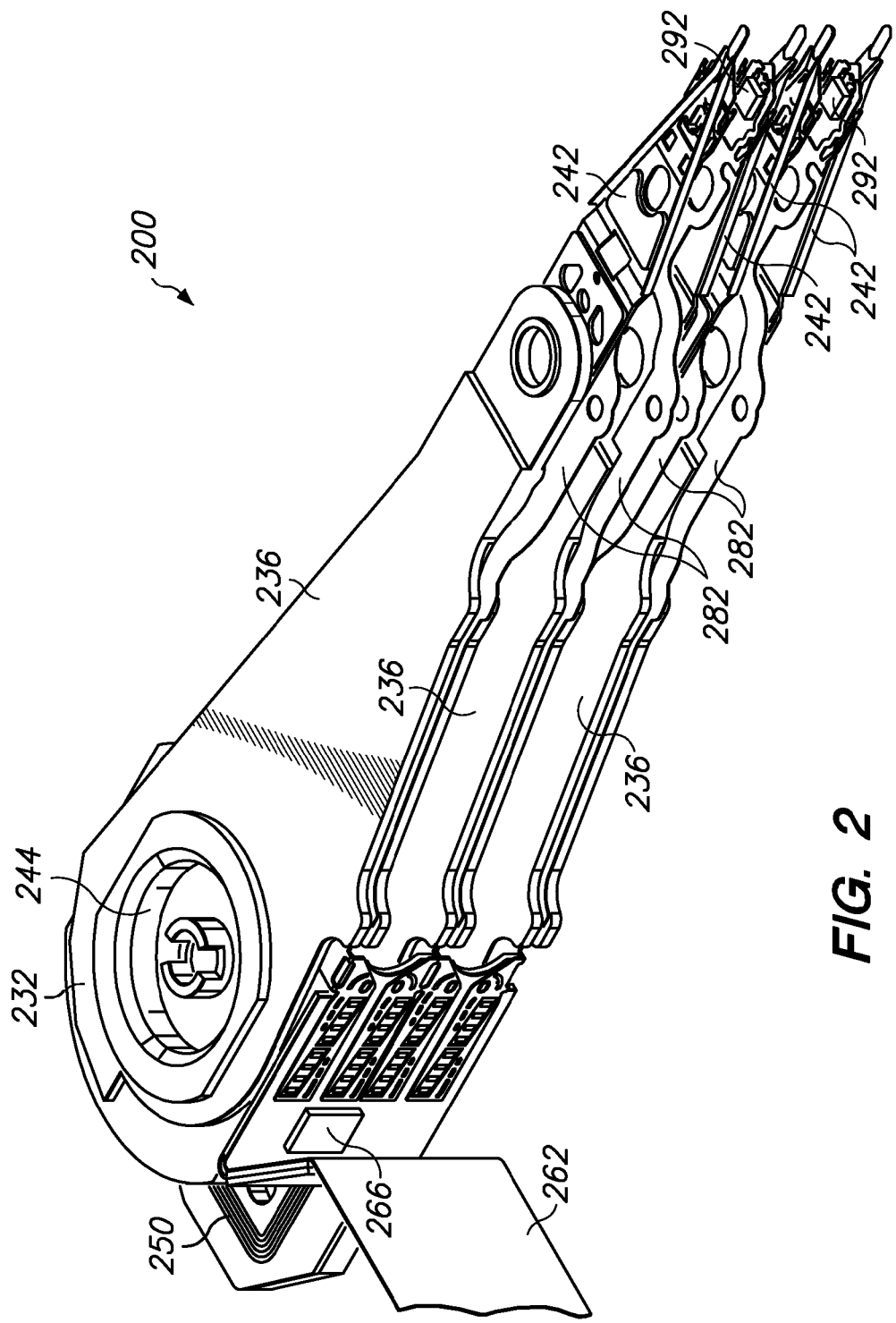
FIG. 2 is a perspective view of a head stack assembly (HSA) capable of including an embodiment of the present invention.

FIG. 2 is a perspective view of a head stack assembly (HSA) 200 capable of including an example embodiment of the present invention. The HSA 200 includes an actuator body 232 and a plurality of actuator arms 236 extending from the actuator body 232. The actuator body 232 may comprise aluminum, for example. The actuator body 232 may include a pivot bearing cartridge 244 disposed in a bore in the actuator body, and a coil 250 that extends from the actuator body 232 in a direction that is generally opposite the actuator arms 236.

In the example of FIG. 2, the HSA 200 also includes a plurality of head gimbal assemblies (HGA) 242 attached to the actuator arms 236. For example, such attachment may be made by swaging. Note that the inner actuator arm includes two HGAs, while each of the outer actuator arms includes only one HGA. This is because in a fully populated disk drive the inner arms are positioned between disk surfaces while the outer actuator arms are positioned over (or under) a single disk surface. In a depopulated disk drive, however, any of the actuator arms may have one or zero HGAs, optionally replaced by a dummy mass.

In certain embodiments, each HGA 242 includes a head 292 for reading and/or writing to an adjacent disk surface. Each head 292 is attached to a tongue portion of a laminated flexure 282. The laminated flexure 282 is part of the HGA 242, and is attached to a load beam subcomponent of the HGA 242. The laminated flexure 282 may include a structural layer (e.g., stainless steel), a dielectric layer (e.g., polyimide), and a conductive layer into which traces are patterned (e.g., copper).

In the example of FIG. 2, the HSA 200 also includes a laminar flexible printed circuit (FPC) 262 adjacent the actuator body 232. The FPC 262 may comprise a laminate that includes two or more conventional dielectric and conductive layer materials (e.g., one or more polymeric materials, copper, etc.). A preamplifier chip 266 may also be mounted on the FPC 262. Each of the laminated flexures 282 includes a flexure tail that is electrically connected to bond pads of the FPC 262.

Figure 3:
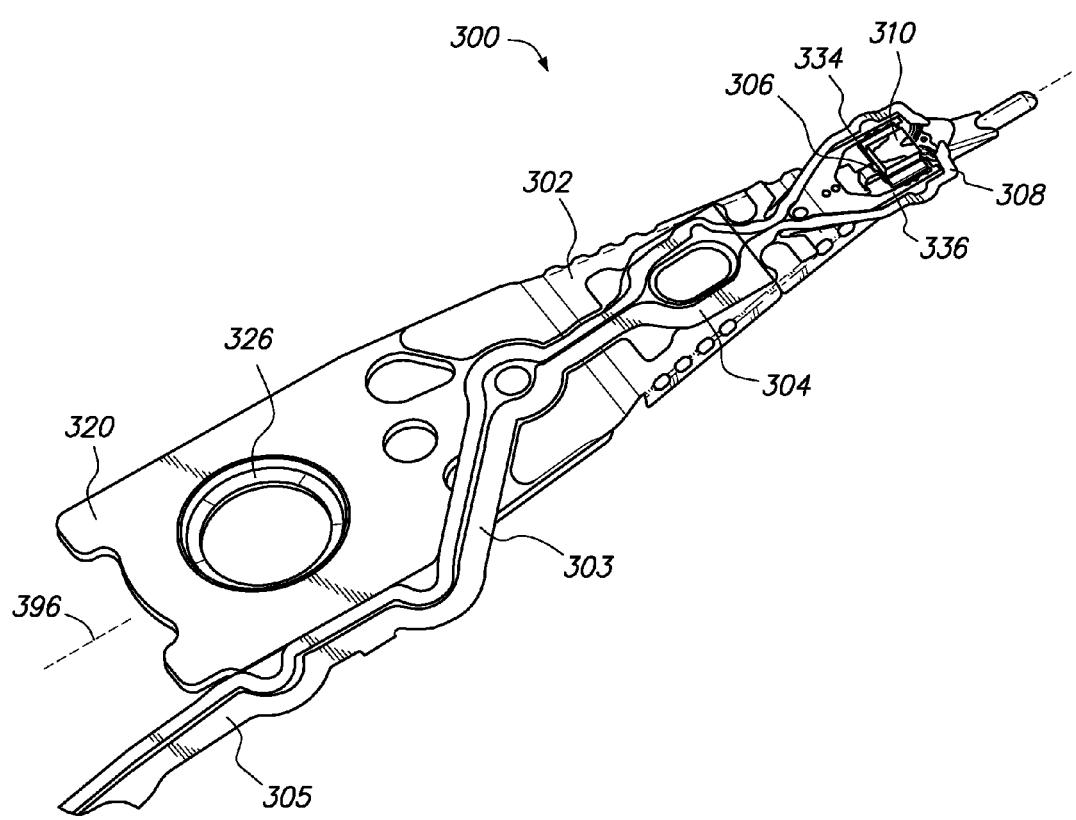
FIG. 3 is a perspective view of an HGA according to an embodiment of the present invention.

FIG. 3 is a perspective view of a HGA 300 according to an embodiment of the present invention. The HGA 300 includes a load beam 302 that defines a load beam longitudinal axis 396, and a read head 310 for reading and writing data from and to a magnetic disk. A purpose of the load beam 302 is to provide limited vertical compliance for the read head 310 to follow vertical undulations of the surface of a disk as it rotates, and to preload an air bearing surface of the read head 310 against the disk surface by a preload force that is commonly referred to as the "gram load." In certain embodiments, the load beam may preferably comprise stainless steel sheet metal having a thickness in the range of 20 to 103 microns.

In the embodiment of FIG. 3, the HGA 300 also includes a laminated flexure 303. In the embodiment of FIG. 3, a distal portion 308 of the laminated flexure 303 includes a tongue 306 to which the read head 310 is adhered. Only a portion of the tongue 306 is visible in the view of FIG. 3 because the read head 310 (and other components of the HGA 300 that will be subsequently described) partially obscures it. The distal portion 308 of the laminated flexure 303 is connected to a non-distal portion 304 of the laminated flexure 303 by outrigger beams 334, 336.

A first purpose of the laminated flexure 303 may be to provide compliance for the head 310 to follow pitch and roll angular undulations of the surface of the disk as it rotates, while restricting relative motion between the read head 310 and the load beam 302 in the lateral direction and about a yaw axis. A second purpose of the laminated flexure 303 may be to provide a plurality of electrical paths to facilitate signal transmission to/from the read head 310. For that second purpose, the laminated flexure 303 may include a plurality of electrically conductive traces that are defined in an electrically conductive (e.g., copper) sub-layer of the laminated flexure 303. The electrically conductive traces may be insulated from a support layer (e.g., stainless steel) by a dielectric layer (e.g., polyimide). The electrically conductive traces may extend away from the read head 310 along a flexure tail 305 of the laminated flexure 303, to reach a portion of the flex cable (not shown) that includes a preamplifier chip near the body of the actuator.

In the embodiment of FIG. 3, a proximal region of the load beam 302 is attached to a mounting plate 320, for example by a plurality of spot welds. The load beam 302, the mounting plate 320, and the laminated flexure 303, may together be referred to as a "suspension assembly." Accordingly, the mounting plate 320 may also be referred to as a suspension assembly mounting plate 320. In certain preferred embodiments, the suspension assembly mounting plate 320 includes an annular swage boss 326 to facilitate attachment of the suspension assembly to an actuator arm by the well-known conventional attachment process known as swaging. In that case, the suspension assembly mounting plate 320 may also be referred to as a "swage mounting plate."

Figure 4A:
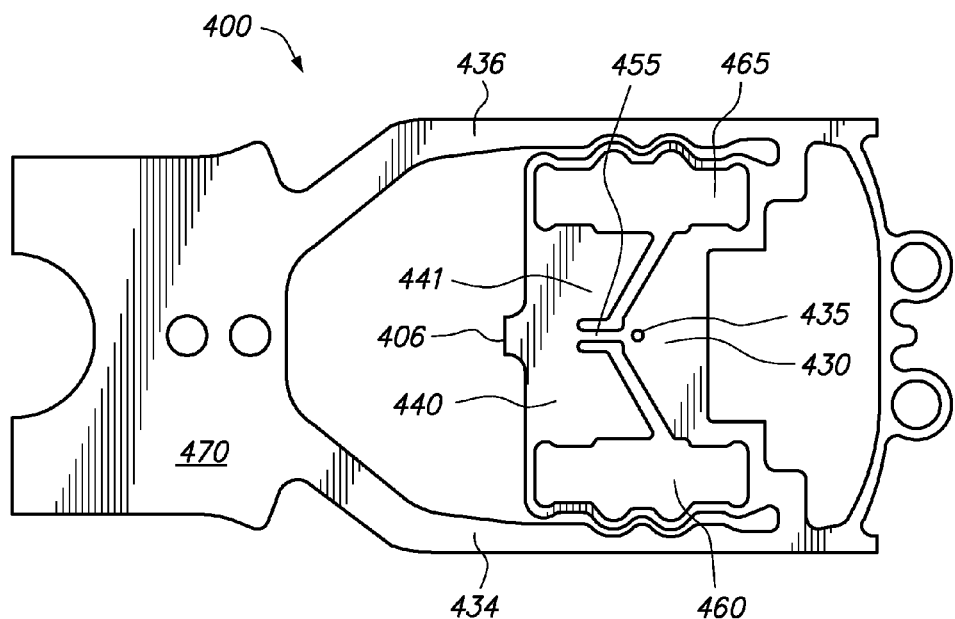
FIG. 4A depicts the distal portion of the structural layer of a laminated flexure, according to an embodiment of the present invention, with other layers of the laminated flexure removed so that details of the structural layer are not obstructed.
Figure 4B:
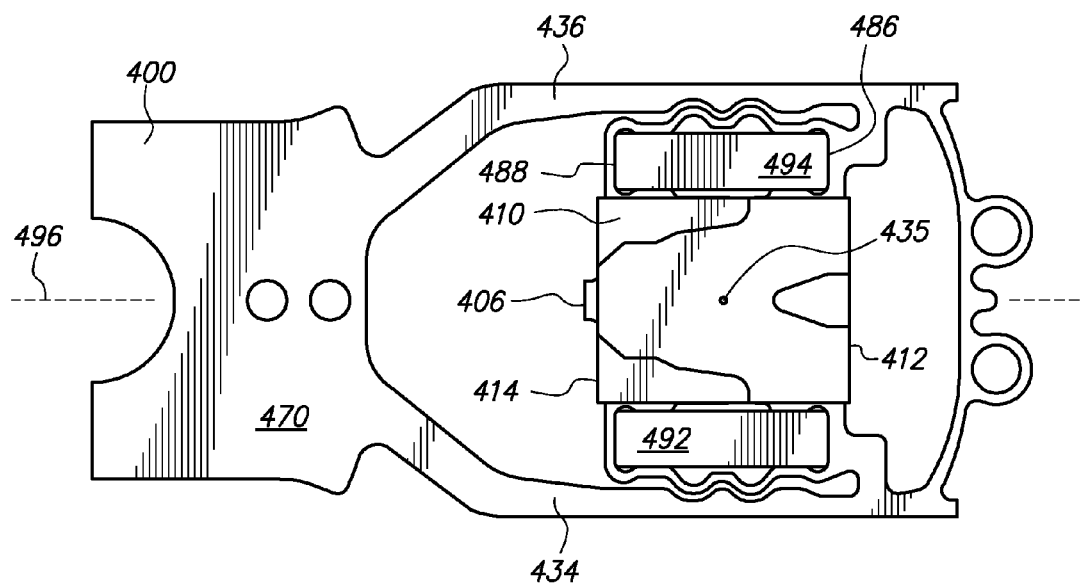
FIG. 4B depicts the distal portion of the structural layer of FIG. 4A, except with the relative position of a read head and piezoelectric elements indicated.

FIG. 4A depicts the distal portion 400 of the structural layer of a laminated flexure, according to an embodiment of the present invention. Note that in FIG. 4A, only the structural layer of the flexure is shown; the conventional dielectric layer, and the conventional traces of the conductive layer of the laminated flexure are not shown, so that certain novel features of the structural layer of the flexure tongue can be seen more clearly. FIG. 4B depicts the distal portion 400 of the structural layer of FIG. 4A, except with the relative position of a read head 410 and piezoelectric elements 492, 494 being indicated.

In the embodiment of FIG. 4B, the read head 410 includes a slider substrate having an air bearing surface (the label 410 points to this surface) and an opposing top surface (not visible in the view of FIG. 4B). The slider substrate preferably comprises AlTiC, although another ceramic or silicon might also be used. The slider substrate of the read head 410 also includes a trailing end 412 that includes a read/write transducer, and a leading end 414. Note: During disk drive operation, the read head 410 will be disposed adjacent a disk surface, with the disk surface moving from the leading end 414 towards the trailing end 412. In certain embodiments, the read/write transducer is preferably an inductive magnetic write transducer merged with a magneto-resistive read transducer (e.g., a tunneling magneto-resistive read transducer).

In the embodiment of FIGS. 4A and 4B, the distal portion 400 of the structural layer of a laminated flexure includes a tongue 406 disposed between two outrigger beams 436, 434. The first piezoelectric element 492 and the second piezoelectric element 494 are adhered to portions of the tongue 406. The read head 410 is also adhered to a portion of the tongue 406 as described further herein.

In the embodiment of FIGS. 4A and 4B, the tongue 406 includes an actuated portion 440 that is rotated about a center of rotation (preferably coincident with dimple contact location 435) by expansion of the first piezoelectric element 492 relative to the second piezoelectric element 494. The tongue 406 also includes a non-actuated portion 430 that is not rotated by expansion of the first piezoelectric element 492 relative to the second piezoelectric element 494. In the embodiment of FIG. 4A, the actuated portion 440 and the non-actuated portion 430 of the tongue 406, and the outrigger beams 434, 436 are optionally a single component having material continuity rather than being an assembly of sub-components. For example, these components may be distinct regions of a single stainless steel sublayer of the laminated flexure, each distinct region being at least partially bounded and defined by etched openings through the single stainless steel sublayer.

In the embodiment of FIGS. 4A and 4B, the non-actuated portion 430 of the tongue 406 adjoins and forms a bridge between the two outrigger beams 434, 436, and so the non-actuated portion 430 may also be referred to herein as the "bridge" 430. The bridge 430 includes a dimple contact location 435 that is in contact with a dimple of the HGA load beam. For example, the load beam (e.g., load beam 302 of FIG. 3) may include a conventional dimple (e.g., a hemispherical dimple) that protrudes towards the read head 410, and contacts the non-actuated portion 430 of the tongue 406 coincident with the dimple contact location 435.

In the embodiment of FIGS. 4A and 4B, the actuated portion 440 of the tongue 406 includes at least one head mounting plate 441 that is adhered to the read head 410 closer to the leading end 414 than to the trailing end 412. Each of the first and second piezoelectric elements 492, 494 has an anchored end (e.g., 486) that is adhered to the bridge 430 closer to the trailing end 412 than to the leading end 414 of the read head 410. Each of the first and second piezoelectric elements 492, 494 has an opposing actuated end (e.g., 488) that is adhered to the actuated portion 440 of the tongue 406 closer to the leading end 414 than to the trailing end 412 of the read head 410.

Note that in the present context, a "read head" is any head that can read, even if it can also perform other functions or includes other structures, such as a writer, heater, etc. Note also that each of the first and second piezoelectric elements 492, 494 may optionally be a multilayer piezoelectric element, comprising a plurality of piezoelectric material layers sandwiched between conductive (e.g., gold) electrode layers. The first and second piezoelectric elements 492, 494 may optionally have a total piezoelectric element thickness in the range of 35 microns to 150 microns. In certain embodiments, the piezoelectric element thickness may be greater than the thickness of the laminated flexure. For example, in certain embodiments the piezoelectric element thickness may be in the range 35 microns to 150 microns, while the thickness of the laminated flexure may be in the range 18 microns to 80 microns.

In the embodiment of FIGS. 4A and 4B, the first piezoelectric element 492 is shown to be embedded in a receiving well 460 of the laminated flexure, for example such that a mid-plane of the first piezoelectric element 492 may be preferably coincident with a mid-plane of the structural layer of the laminated flexure adjacent the receiving well 460. Likewise, the second piezoelectric element 494 may be embedded in a receiving well 465 of the laminated flexure, such that a mid-plane of the second piezoelectric element 494 may be coincident with a mid-plane of the structural layer of the laminated flexure adjacent the receiving well 465. In some embodiments, such embedding of the first and second piezoelectric elements 492,494 may advantageously reduce unwanted out-of-plane actuation. However, the piezoelectric elements 492,494 may alternatively be simply adhered on to top or bottom surfaces of the tongue 406, rather than being embedded.

The receiving wells 460, 465 may each comprise an opening that optionally passes through the structural layer and the dielectric layer of the laminated flexure. The opening is optionally larger through the structural layer to allow the corresponding piezoelectric element to be received within the opening in the structural layer. However, the opening may be optionally smaller through the dielectric layer to prevent the corresponding piezoelectric element from passing through the dielectric layer.

Note that in the embodiment of FIGS. 4A and 4B, each of the first and second piezoelectric elements 492,494 is elongated in the longitudinal direction 496, and the read head 410 is disposed between the first and second piezoelectric elements 492,494. In this context, being elongated in a direction means being longer than wide with respect to that direction. Also, in this context, "between" is as viewed from a viewing direction normal to the air bearing surface of the read head 410. In certain embodiments, this may provide a design freedom advantage, in that it may then be possible to optionally mount the piezoelectric elements on the same side of the structural layer as is the read head 410.

In the embodiment of FIGS. 4A and 4B, the at least one head mounting plate 441 is connected to the non-actuated portion 430 of the tongue 406 by an elongated compliant member 455 that is oriented radially (and in this case also longitudinally) with respect to the dimple contact location 435. In this context, being oriented radially does not require being oriented perfectly radially, but rather practically within ±20° of being oriented perfectly radially.

In certain embodiments, such radial orientation may help provide pure rotary motion about the dimple contact location 435, which may reduce undesired coupling between microactuator operation and the HGA yaw or sway mode of vibration. Although it is preferred that the rotary motion of the microactuator be about an axis (i.e. center of rotation) that is coincident with the dimple contact location 435, in this context being "coincident with" does not require that the axis of rotation perfectly passes through the dimple contact location 435, but rather is approximately coincident with the dimple contact location 435, considering part-to-part variations and tolerances in a real rather than ideal manufacturing environment.

In the embodiment of FIGS. 4A and 4B, the two outrigger beams 434, 436 connect the non-actuated portion 430 of the tongue 406 to a proximal region 470 of the laminated flexure. In turn, the proximal region 470 of the laminated flexure overlaps and is attached to a proximal region of the load beam, which is itself attached to an actuator arm (e.g., via a swage mounting plate).

Each of the first and second piezoelectric elements 492, 494 may optionally comprise one or more of the many known piezoelectric materials, for example lead zirconate titanate, lead scandium tantalite, lanthanum gallium silicate, lithium tantalite, barium titanate, gallium phosphate and/or potassium sodium tartrate.

In certain embodiments, the adhesive used to bond the first and second piezoelectric elements 492, 494 within the receiving wells 460, 465 may be an electrically non-conductive cyanoacrylate, epoxy, polyimide, and/or acrylic. The non-conductivity of such adhesive may be advantageous in certain embodiments where electrode layers of a piezoelectric element might otherwise be shorted, though a conductive adhesive might provide an advantageous electrical connection (e.g., to ground) in certain embodiments where a coating on the piezoelectric element would otherwise prevent shorting. For example, in certain embodiments, a side of each piezoelectric element 492, 494 may be grounded via electrical conduction through the stainless steel parts of the suspension assembly (used as the ground conductor rather than or in addition to a ground trace of the laminated flexure). In certain embodiments, a conductive adhesive, solder, ribbon leads, and/or gold wire stitching may be used to make conventional electrical connections to the piezoelectric elements 492, 494. However, if solder is used, then it may be desirable for the solder to have a low temperature melting point, since it may be undesirable for it to get so hot that the piezoelectric material becomes depolarized.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
   a disk drive base;
   a spindle attached to the disk drive base;
   a disk mounted on the spindle;
   a first actuator pivotally attached to the disk drive base, the first actuator including a conductive coil and an actuator arm;
   a head suspension assembly comprising
      a load beam having a proximal region that is attached to the actuator arm and a distal region that includes a dimple;
      a laminated flexure comprising a dielectric layer between a structural layer and a conductive layer, the conductive layer being patterned to include a plurality of conductive traces, the structural layer including a tongue disposed between two outrigger beams; and
      first and second piezoelectric elements adhered to the tongue; and a read head disposed adjacent a surface of the disk, the read head having a leading end and a trailing end, the disk surface moving from the leading end towards the trailing end during disk drive operation;

wherein the tongue includes an actuated portion that is rotated about an axis of rotation by expansion of the first piezoelectric element relative to the second piezoelectric element, and the tongue includes a non-actuated portion that is not rotated by expansion of the first piezoelectric element relative to the second piezoelectric element;

wherein the non-actuated portion of the tongue adjoins and forms a bridge between the two outrigger beams, and the bridge includes a dimple contact location that is in contact with the dimple of the load beam, the axis of rotation passing through the dimple contact location;

wherein the actuated portion of the tongue includes at least one head mounting plate that is adhered to the read head closer to the leading end than to the trailing end; and wherein each of the first and second piezoelectric elements has an anchored end that is adhered to the bridge closer to the trailing end than to the leading end of the read head, and each of the first and second piezoelectric elements has an opposing actuated end that is adhered to the actuated portion of the tongue closer to the leading end than to the trailing end of the read head.

2. The disk drive of claim 1 wherein each of the first and second piezoelectric elements is a multilayer piezoelectric element, comprising a plurality of piezoelectric material layers sandwiched between conductive electrode layers.

3. The disk drive of claim 1 wherein the first piezoelectric element is embedded in a receiving well of the laminated flexure, such that a mid-plane of the first piezoelectric element is coincident with a mid-plane of the structural layer of the laminated flexure adjacent the receiving well.

4. The disk drive of claim 3 wherein the receiving well comprises an opening that passes through the structural layer and the dielectric layer, the opening being larger through the structural layer to allow the first piezoelectric element to be received within the opening in the structural layer, but the opening being smaller through the dielectric layer to prevent the first piezoelectric element from passing through the dielectric layer.

5. The disk drive of claim 1 wherein the head suspension assembly further includes a mounting plate having an annular raised swage boss, the proximal region of the load beam being attached to the actuator arm by the mounting plate.

6. The disk drive of claim 1 wherein the load beam comprises stainless steel sheet metal having a thickness in the range of 20 to 103 microns.

7. The disk drive of claim 1 wherein the at least one head mounting plate is connected to the non-actuated portion of the tongue by an elongated compliant member that is oriented radially with respect to the dimple contact location.

8. The disk drive of claim 1 wherein the load beam comprises stainless steel, the structural layer of the laminated flexure comprises stainless steel, the dielectric layer of the laminated flexure comprises polyimide, and the conductive layer of the laminated flexure comprises copper.

9. The disk drive of claim 1 wherein each of the first and second piezoelectric elements has a piezoelectric element thickness in the range of 35 microns to 150 microns.

10. The disk drive of claim 1 wherein the two outrigger beams connect the non-actuated portion of the tongue to a proximal region of the laminated flexure, the proximal region of the laminated flexure overlapping and being attached to the proximal region of the load beam.

11. The disk drive of claim 1 wherein the actuator arm extends and is elongated in a longitudinal direction, and each of the first and second piezoelectric elements is elongated in the longitudinal direction.

12. The disk drive of claim 11 wherein the read head is disposed between the first and second piezoelectric elements.

13. A head gimbal assembly (HGA) for a disk drive, the HGA comprising:

a mounting plate having an annular raised swage boss;

a load beam having a proximal region that is attached to the mounting plate and a distal region that includes a dimple;

a laminated flexure comprising a dielectric layer between a structural layer and a conductive layer, the conductive layer being patterned to include a plurality of conductive traces, the structural layer including a tongue disposed between two outrigger beams; and first and second piezoelectric actuators adhered to the tongue;

wherein the tongue includes an actuated portion that is rotated about an axis of rotation by expansion of the first piezoelectric element relative to the second piezoelectric element, and the tongue includes a non-actuated portion that is not rotated by expansion of the first piezoelectric element relative to the second piezoelectric element;

wherein the non-actuated portion of the tongue adjoins and forms a bridge between the two outrigger beams, and the bridge includes a dimple contact location that is in contact with the dimple of the load beam, the axis of rotation passing through the dimple contact location; and the HGA further comprising a read head having a leading end and a trailing end, wherein the actuated portion of the tongue includes at least one head mounting plate that is adhered to the read head closer to the leading end than to the trailing end; and wherein each of the first and second piezoelectric elements has an anchored end that is adhered to the bridge closer to the trailing end than to the leading end of the read head, and each of the first and second piezoelectric elements has an opposing actuated end that is adhered to the actuated portion of the tongue closer to the leading end than to the trailing end of the read head.

14. The HGA of claim 13 wherein each of the first and second piezoelectric elements is a multilayer piezoelectric element, comprising a plurality of piezoelectric material layers sandwiched between conductive electrode layers.

15. The HGA of claim 13 wherein the first piezoelectric element is embedded in a receiving well of the laminated flexure, such that a mid-plane of the first piezoelectric element is coincident with a mid-plane of the structural layer of the laminated flexure adjacent the receiving well.

16. The HGA of claim 15 wherein the receiving well comprises an opening that passes through the structural layer and the dielectric layer, the opening being larger through the structural layer to allow the first piezoelectric element to be received within the opening in the structural layer, but the opening being smaller through the dielectric layer to prevent the first piezoelectric element from passing through the dielectric layer.

17. The HGA of claim 13 wherein the at least one head mounting plate is connected to the non-actuated portion of the tongue by an elongated compliant member that is oriented radially with respect to the dimple contact location.

18. The HGA of claim 13 wherein the two outrigger beams connect the non-actuated portion of the tongue to a proximal region of the laminated flexure, the proximal region of the laminated flexure overlapping and being attached to the proximal region of the load beam.

19. The HGA of claim 13 wherein the actuator arm extends and is elongated in a longitudinal direction, and each of the first and second piezoelectric elements is elongated in the longitudinal direction.

20. The HGA of claim 19 wherein the read head is disposed between the first and second piezoelectric elements.

* * * * *